Aug. 8, 1944.     B. F. SCHMIDT     2,355,115
CONDUIT SUPPORTING CLIP
Filed March 24, 1943
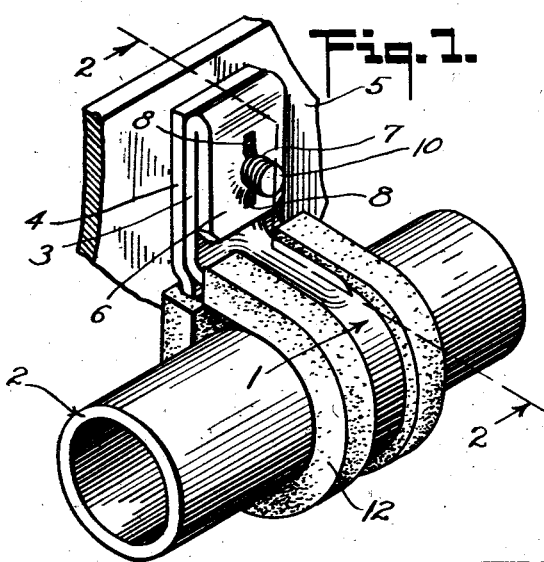
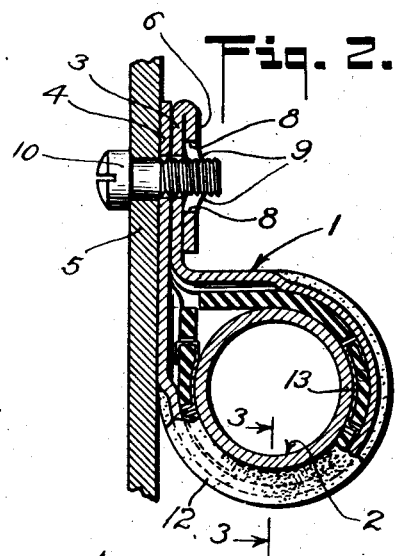
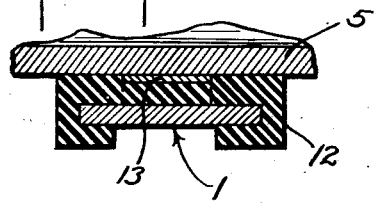
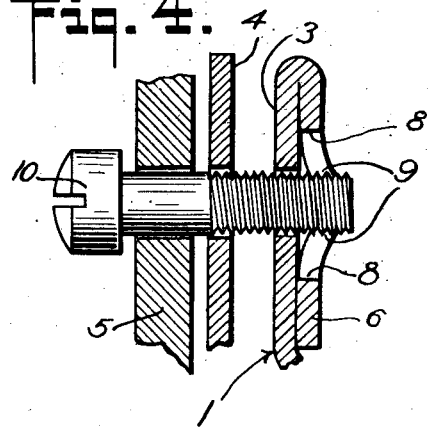
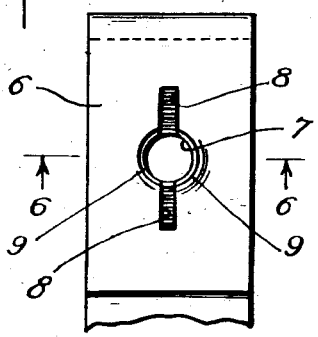
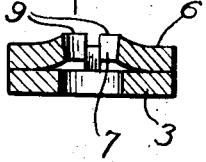
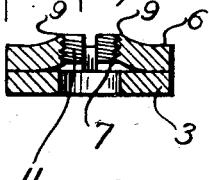
Inventor
BENJAMIN F. SCHMIDT
By R. S. Berry
Attorney Patented Aug. 8, 1944

2,355,115

UNITED STATES PATENT OFFICE 2,355,115

CONDUIT SUPPORTING CLIP

Benjamin F. Schmidt, Los Angeles, Calif., assignor to Adel Precision Products Corp., a corporation of California Application March 24, 1943, Serial No. 480,402

1 Claim. (Cl. 248—74)

This invention relates to clips for supporting the fluid conducting and other conduit lines in aircraft and has for an object the provision of an improved nut construction provided on the clip and arranged so that not only is the installation of the clip rendered easier and quicker of performance with a consequent saving in time, labor and costs but the device as a whole reinforced and simplified as to construction.

I am aware of conduit clips which have separate nuts mounted thereon so that when a bolt is applied to hold the clip on the conduit and secure it to a support it will be readily threaded through the nut. Moreover, I am aware of clips wherein an integral nut formation has been made in one of the opposed apertured ends of the metal strap member of the clip. In the case of separate nuts it is necessary to provide an extraneous fastening means to secure the nut to the clip and often the construction of the clip is altered to accommodate the fastening of the nut thereto. Where integral "nuts" are formed on the ends proper of the clip in the manner heretofore followed, the clip ends are weakened and the nut formations do not afford an effective guide in applying the bolt, with the result that a ready application of the bolt is sometimes difficult of performance.

In certain types of nuts heretofore used or deemed subject to use for conduit clips, opposed bolt gripping tongues have been formed by making a pair of parallel longitudinal slits in an end member or an elongated sheet metal nut body portion with said slits extending past and outwardly spaced from opposite sides of a bolt hole. The body portion is slit transversely of the longitudinal slits so as to intersect opposite points of the margin of the hole and also intersect the longitudinal cuts, thereby defining the opposed tongues which are bent outwardly to grip the bolt. This formation requires four slits as well as the bolt hole and this obviously weakens the body of the nut.

An important object of my invention is to provide a conduit clip having an integral nut which does away with the objections to the nuts heretofore employed, is cheaper and easier to make, and affords the advantages hereinbefore noted by reason of the bending back on itself of one end of the metal strap member of the clip and the formation in this bent-back portion of a particular nut construction which is reliable and self-locking in its action and does not appreciably weaken the portion in which it is formed nor require the formation of screw threads therein.

Another object of my invention is to provide a conduit clip of the character described wherein an integral nut formation may be produced at a lower cost, and with less weight and bulk than heretofore.

Another object of my invention is to provide an improved nut construction which may be readily and easily formed in a plate-like small gauge sheet metal body by forming an opening in said body for reception of a bolt, punching or burring outwardly from the plane of the body the portions thereof defining the margin of said opening to define arcuate bolt embracing edges adapted to bite into the threads of the bolt and making a single slit in the body so as to intersect the outwardly bent marginal portions of said opening at diametrically opposite points thereby making such portions somewhat yieldable and subject to constriction.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention and as when completely installed;

Fig. 2 is a vertical sectional view taken on the line 2—2 of Fig. 1;

Fig. 3 is a sectional view taken on the line 3—3 of Fig. 2;

Fig. 4 is a fragmentary vertical sectional view showing the manner in which the bolt is applied;

Fig. 5 is a fragmentary front elevation particularly showing the nut formation;

Fig. 6 is a cross sectional view taken on the line 6—6 of Fig. 5;

Fig. 7 is a cross sectional view similar to Fig. 6 showing a modified form of nut.

As shown in the accompanying drawing one embodiment of my invention comprises a conduit-supporting clip which includes a tensioned metallic strap 1 adapted to embrace a conduit 2 and having outwardly extending opposed and apertured ends 3 and 4 which when brought together will constrict the strap and clamp it around the conduit, also provide for the bolting of the strap on a structural part 5 of the aircraft as shown in Figs. 1, 2 and 4.

In accordance with my invention a nut is formed integral with the end 3 of the strap 1, said end being bent back on itself as at 6 and the "nut" being embodied in said bent-back portion. As here provided the nut is formed by making a circular opening 7 in the bent-back portion 6, striking or forcing outwardly the metal comprising the margin of said opening, and providing a longitudinal slit 8 so that the opening 7 is intersected at diametrically opposite points of its outwardly struck margin, thereby producing in effect small opposed arcuate tongues 9 between the intersecting portions and which constitute the margin of said opening.

It should be noted that the opening 7 in the bent back portion 6 is of somewhat smaller diameter than the aperture in the end 3 proper so that a bolt 10 may be passed freely through and guided in said aperture and readily turned therein so as to be threaded through the opening 7 with the threads of the bolt cutting into the outer and substantially semi-circular edges of the tongues 9.

Thus it is seen that the edges of the tongues 9 form substantially the entire margin of a circular opening through which the bolt is threaded. As the bolt is screwed in, the threads on the bolt tend to draw said edges toward one another so as to constrict the opening and therefore provide a locking action. The bolt will cut threads in the edges of the tongues 9 which edges, except where slightly interrupted by the slit 8, substantially surround the bolt, thereby affording more nut stock and more securely locking the bolt than has been possible heretofore with nuts of the type wherein opposed tongues as hereinbefore noted are formed by a pair of slits extending lengthwise of the tongues as well as by slits which extend transversely of and intersect the lengthwise slits.

It is now apparent that in cutting a single slit lengthwise of the bent back portion 6 along the longitudinal medial line thereof so as to intersect a circular opening at diametrically opposite points of the outwardly burred margin of the opening, and leaving the metal intact around the remainder of the opening, I provide a nut which is much more simple as to its construction, cheaper and easier to manufacture and affords a greater and more reliable holding action than any similar nut construction heretofore produced. Moreover, the present construction takes up less space, is more compact, reinforces rather than weakens the clip and at the same time provides a guide for the bolt.

As shown in Fig. 7 I may, if it is desired, form screw threads 11 on the edges of the tongues 9 to facilitate the installation of the clip.

The clip shown in this application is provided with a cushion strip 12 of yieldable and insulation material such as rubber, synthetic rubber or the like which is mounted in the strap 1 so as to embrace the conduit 2 and form a vibration-absorbing seat therefor. An electrically conductive strip 13 is carried by or associated with the cushion strip and the metal strap 1 so that a portion thereof will contact the conduit, and another portion will contact the strap to bond the conduit to the metal structure of the aircraft to prevent accumulation of static electricity in the conduit line.

It is now seen that the bolt 10 after being passed through the structural member 5, the apertured end 4 and the aperture in the end 3 is thus maintained properly aligned for being threaded into the nut formation on the bent back portion 6 as shown in Fig. 4 so as to draw the ends 3 and 4 together and bolt the clip to said structural member as shown in Figs. 1 and 2, the arcuate tongues 9 having a tensioned and threaded engagement with the bolt to hold the same and the clip securely in place.

It is obviously that a nut formed in accordance with my invention in a plate-like body portion such as the bent back member 6, but which is not integral but firmly secured in any suitable manner against an end of the clip would afford advantages of my invention in a satisfactory manner.

While I have shown and described specific embodiments of my invention I do not limit myself to the exact details of construction set forth, and the invention embraces such changes, modifications and equivalents of the parts and their formation and arrangement as come within the purview of the appended claim.

I claim:

In a conduit supporting clip, a metallic conduit-embracing strap having opposed apertured ends, an integral nut comprising a body member formed by bending back on itself one of said apertured ends, an opening in said body member in registration with the apertures in said ends, and arcuate portions of said body member around the opening therein struck outwardly therefrom and disposed to have tensioned engagement with a screw threaded fastening when the latter, after being inserted through said ends, is turned in said opening, said body member having a single slit therein extending so as to intersect said opening at diametrically opposite points.

BENJAMIN F. SCHMIDT.